(12) United States Patent
Brandwijk

(10) Patent No.: US 10,093,488 B2
(45) Date of Patent: Oct. 9, 2018

(54) SHAPE-SHIFTING A CONFIGURATION OF REUSABLE ELEMENTS

(71) Applicant: Arie Quirinus Bastiaan Brandwijk, Bilthoven (NL)

(72) Inventor: Arie Quirinus Bastiaan Brandwijk, Bilthoven (NL)

(73) Assignee: RND BY US B.V., Bilthoven (NL)

(*) Notice: Subject to any disclaimer, the term of this patent is extended or adjusted under 35 U.S.C. 154(b) by 691 days.

(21) Appl. No.: 13/843,340

(22) Filed: Mar. 15, 2013

(65) Prior Publication Data

US 2014/0274416 A1    Sep. 18, 2014

(51) Int. Cl.
*A63F 9/08*     (2006.01)
*B65G 25/08*    (2006.01)
*A63H 33/04*    (2006.01)

(52) U.S. Cl.
CPC ........... *B65G 25/08* (2013.01); *A63H 33/042* (2013.01); *A63F 9/083* (2013.01); *A63F 9/0826* (2013.01); *A63H 33/046* (2013.01)

(58) Field of Classification Search
CPC ........ A63F 9/0826; A63F 9/12; A63F 9/0612; A63F 9/08; B25J 9/16
See application file for complete search history.

(56) References Cited

U.S. PATENT DOCUMENTS

| | | |
|---|---|---|
| 4,526,372 A | 7/1985 | Kikis |
| 4,608,525 A * | 8/1986 | Mori .................. B23Q 1/34 |
| | | 700/248 |
| 5,016,540 A | 5/1991 | Barber |
| 5,232,154 A | 8/1993 | Jenkins et al. |
| 6,157,872 A * | 12/2000 | Michael .............. E04B 1/34331 |
| | | 700/247 |
| 6,241,248 B1 | 6/2001 | Winter |
| 6,487,454 B1 | 11/2002 | Tymes |
| 6,520,641 B1 | 2/2003 | Walton et al. |
| 7,832,729 B2 | 11/2010 | Park |

(Continued)

FOREIGN PATENT DOCUMENTS

| | | |
|---|---|---|
| EP | 0129853 A1 | 1/1985 |
| GB | 2287045 A | 9/1995 |

(Continued)

OTHER PUBLICATIONS

Dynamically Reconfigurable Robotic System by Fukuda, Toshio et al. pp. 1581-1586, 1988 IEEE.*

(Continued)

*Primary Examiner* — James S McClellan
*Assistant Examiner* — Syvila Weatherford
(74) *Attorney, Agent, or Firm* — Jordan IP Law, LLC; Todd A. Vaughn

(57) ABSTRACT

A game, and a method for playing a game, that includes providing an initial shape of a plurality of elements, and an end shape that includes the elements by displacing, using a motion module for at least one element, which motion function provides the at least one element with its own movement ability relative to the other elements, in which the end shape is different than the initial shape; providing a set of parameters which together with the end shape determine losing or winning the game. The game is completed on a basis of the parameters and a position of the elements in relation to the end shape.

25 Claims, 12 Drawing Sheets

(56) References Cited

U.S. PATENT DOCUMENTS

| | | | |
|---|---|---|---|
| 8,387,989 B2* | 3/2013 | Baum | A63F 9/0073 273/156 |
| 2002/0196250 A1* | 12/2002 | Anderson | G06T 19/00 345/420 |
| 2006/0155388 A1* | 7/2006 | Pietrzyk | A63H 33/042 700/2 |
| 2009/0184467 A1* | 7/2009 | Henderson | A63F 9/08 273/153 S |
| 2012/0122059 A1 | 5/2012 | Schweikardt et al. | |
| 2014/0031980 A1 | 1/2014 | Gutmann et al. | |
| 2014/0213140 A1* | 7/2014 | Goh | G06F 3/002 446/175 |

FOREIGN PATENT DOCUMENTS

| | | |
|---|---|---|
| GB | 2424510 A | 9/2006 |
| WO | 9523676 A1 | 9/1995 |
| WO | 2004/062759 A1 | 7/2004 |
| WO | 2013183328 A1 | 12/2013 |

OTHER PUBLICATIONS

Communication Architecture for Cellular Robotic System, Ueyama, Tsuyoshi et al. pp. 353-360, JSME International Journal, Series C, vol. 36, No. 3, 1993.*

Sructure Decision Method for Self Organising Robots Based on Cell Structures-CEBOT, pp. 695-700, 1989 IEEE.*

International Preliminary Report on Patentability for International Patent Application No. PCT/NL2014/050154, dated Feb. 27, 2015, 6 pages.

Yosuke Suzuki et al., "Reconfigurable group robots adaptively transforming a mechanical structure—numerical expression of criteria for structural transformation and automatic motion planning method", 2007 IEEE/RSJ International Conference on Intelligent Robots and Systems, Oct. 2007, pp. 2361-2367, San Diego, CA, USA.

Yosuke Suzuki et al., "Reconfigurable group robots adaptively transforming a mechanical structure—Crawl motion and adaptive transformation with new algorithms", 2006 IEEE/RSJ International Conference on Intelligent Robots and Systems, Oct. 2006, pp. 2200-2205, Beijing, China.

Yosuke Suzuki et al., "Self-Reconfigurable Modular Robots Adaptively Transforming a Mechanical Structure: Algorithm for Adaptive Transformation to Load Condition", Journal of Robotics, Oct. 2011, vol. 2011, 13 pages, Hindawai Publishing Corporation, Tokyo, Japan.

T. Fukuda et al., "Communication System of Cellular Robot: CEBOT", 15th Annual Conference of IEEE, Industrial Electronics Society, 1989, vol. 3, pp. 634-639.

T. Fukuda et al., "Dynamically Reconfigurable Robotic System", 1988 IEEE International Conference on Robotics and Automation, 1988, vol. 3, pp. 1581-1586.

T. Fukuda et al., "Self-Organizing Robotic Systems-Organization and Evolution of Group Behavior in Cellular Robotic System", 1994 IEEE Proceedings From Perception to Action Conference, 1994, pp. 24-35.

"Rubik's Snake", best of the 80s, retrieved from bestofthe80s.wordpress.com/2010/03/22/rubiks-snake/, Mar. 22, 2010, 1 page.

"Rubik's Snake", retrieved from folk.uio.no/oisteihh/rubik/snake_patterns_for_extra_long_Rubiks_snakes.html, Aug. 11, 2014, 1 page.

* cited by examiner

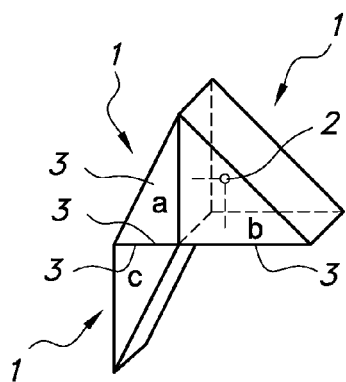
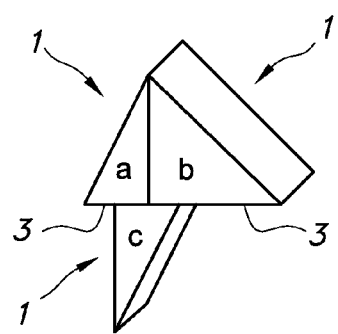
FIG. 1A  FIG. 1B
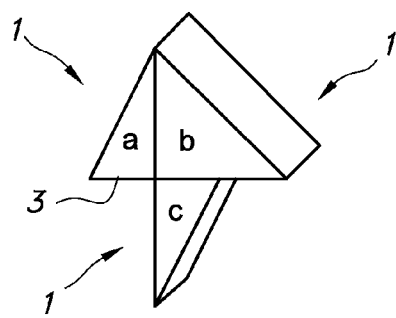
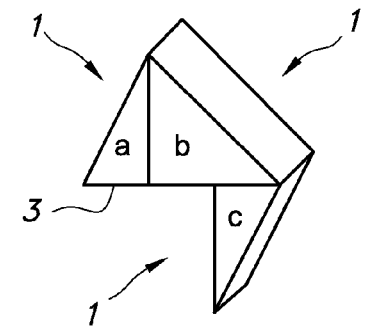
FIG. 1C  FIG. 1D
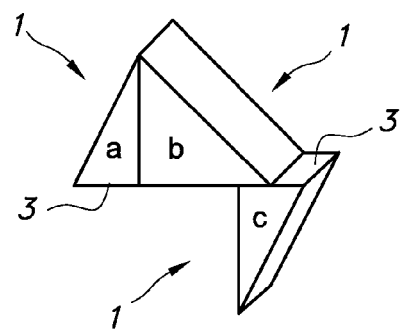
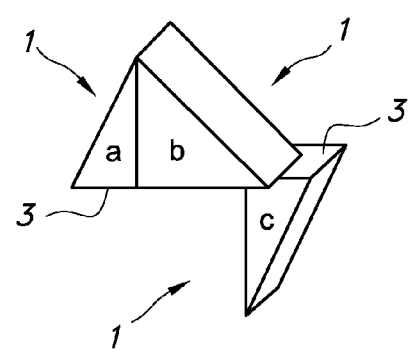
FIG. 1E  FIG. 1F

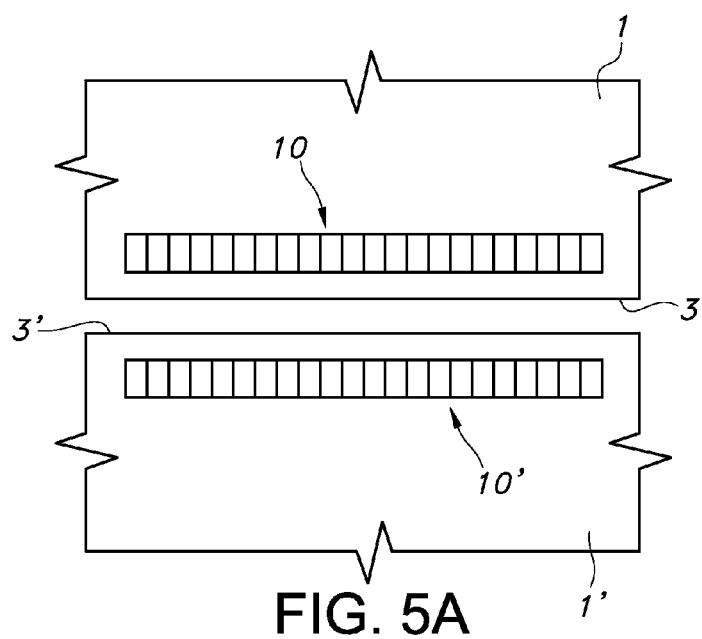
FIG. 5A
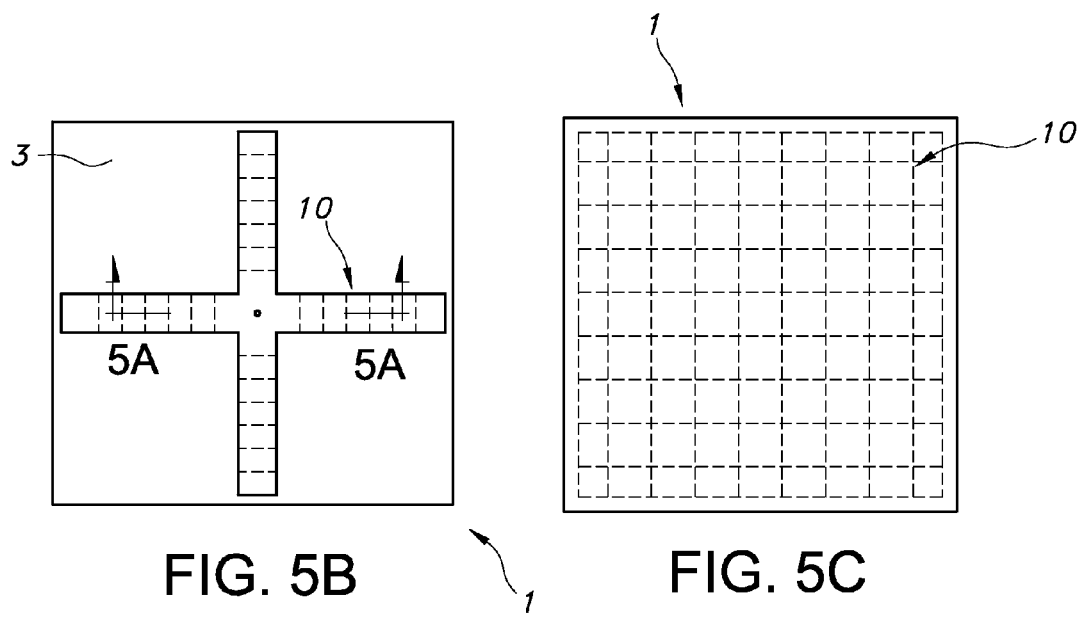
FIG. 5B
FIG. 5C

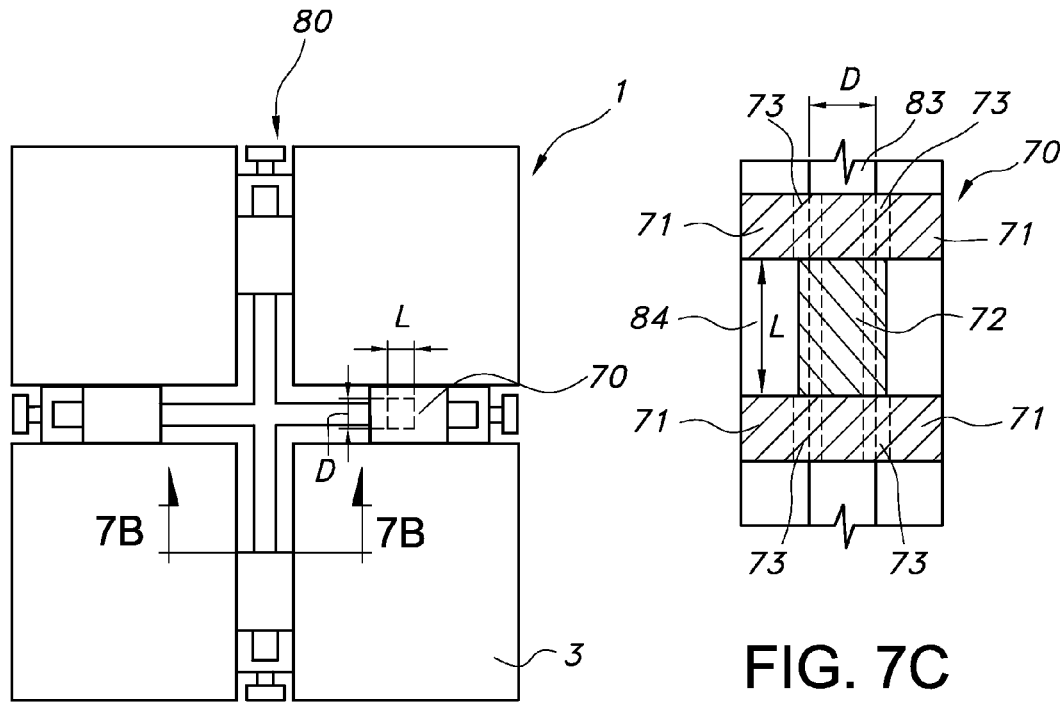
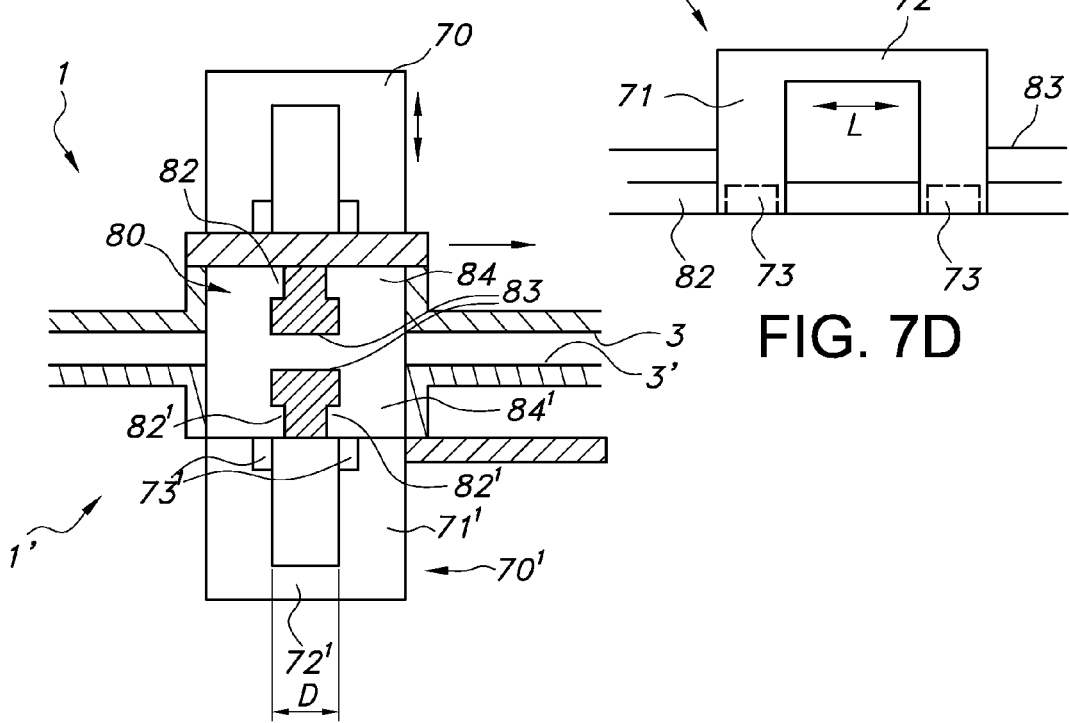
FIG. 7A
FIG. 7C
FIG. 7D
FIG. 7B

SHAPE-SHIFTING A CONFIGURATION OF REUSABLE ELEMENTS

TECHNICAL FIELD

Embodiments relate to an assembly of elements, and elements suitable and configured for such an assembly.

BACKGROUND

Since the history of man, people are making constructions of all kinds. In order to make constructing easier, a construction was divided into elements. These elements were standardized to make production easier. Examples of this standardisation are, for buildings for instance, bricks for building a house, beams and roof tiles, and more recently concrete parts like floor panels, window, but also doors and other parts of a building. This concept of standardized parts is also used for other types of constructions, like cars, computers, and, in fact, all industrially produced constructions.

A problem with most of these elements is that they require handling. Furthermore, the elements are used for a specific construction, or a specific use, like toys. Furthermore, often the known elements are not reusable.

SUMMARY

Embodiments relate to a system of elements that allow a flexible use.

Embodiments thus pertain to a system comprising at least one of a first, a second and a third three-dimensional element, each element comprising: a centre point in each said element; a motion-guiding module, coupled to said centre point and defining a predefined trajectory over said element; a motion module, adapted for displacing the centre point with respect to a second centre point of one of the other elements using the motion-guiding module of that other element; a motion-restriction module, adapted for limiting the displacement of said centre point with respect to the second centre point to at least one trajectory selected from the group consisting of said predefined trajectory and a second predefined trajectory of said other element, wherein said motion-guiding modules of at least two of said elements are functionally coupled for enabling said motion module to displace the centre point of a third, displacing element which is in contact with one of the other two elements away from the centre point of one of the other two elements and towards the centre point and in contact with the other of the other two elements.

It was found that such a system with the elements allow flexible construction of an object. It may even be possible to design the elements within the current definition to group the elements into an object and to change the shape of an object autonomously. In accordance with embodiments, at least one element can be provided with a building plan for the shape. In an alternative embodiment, the building plan can be distributed over elements, and by communicating and distributing control, the elements together may accomplish shifting the shape.

In this description, a configuration is used for an assembly of elements that are grouped together in a substantially consistent orientation with respect to one another. The elements in such a configuration may form an object.

In accordance with embodiments, each element further comprising a face provided with a surface at a surface-distance from said centre point.

In accordance with embodiments, said motion-guiding module comprises a trail of detectable indications, in particular a trail of electromagnetical radiation, like light, a magnetical trail, an electrostatic trail, sound or ultrasound trail.

In accordance with embodiments, said trajectory comprises a physical track.

In accordance with embodiments, said trajectory comprises a rail.

In accordance with embodiments, said trajectory at least partly follows a straight line.

In accordance with embodiments, said element comprises at least one face comprising a surface provided with said motion-guiding module.

In accordance with embodiments, said motion-guiding module comprises at least two motion-guiding parts defining a plane.

In accordance with embodiments, two motion-guiding parts have at least one crossing, in particular said motion-guiding parts are straight and cross one another rectangularly.

In accordance with embodiments, said element comprises at least one face comprising a surface provided with said motion module, in particular said surface is a flat plane forming a face of said element.

In accordance with embodiments, said element comprises at least one face comprising a surface provided with said motion module and said motion-guiding module.

In accordance with embodiments, said element comprises a series faces each having a surface, in particular said faces defining said element.

In accordance with embodiments, said element comprises a series of at least two of said faces, in particular said element comprises a series of coupled faces forming faces of said element.

In accordance with embodiments, said element comprises at least four faces, in particular at least six faces, more in particular opposite and having a normal direction orthogonal normal.

In accordance with embodiments, said element is a regular body.

In accordance with embodiments, said element is substantially a block, more in particular a cube.

In accordance with embodiments, said motion-restriction module comprises a first motion-restriction module part, arranged for physically engaging another element, and restricting motion in a first direction having a component perpendicular to said trajectory.

In accordance with embodiments, said motion-restriction module comprises a second motion-restriction module part, arranged for physically engaging an other element and restricting motion in a second direction having a component perpendicular to said trajectory and perpendicular to said first direction.

Embodiments relate to an element comprising: at least one face comprising an exterior surface for providing abutment for a face of another, similar element; at least one holding module for holding said element with respect to at least one other, similar element, said holding selected from holding position and holding orientation; at least one motion module for moving said element with respect to at least one other, similar element substantially along or on an exterior surface of at least one other, similar element, said moving selected from displacing of a centre of mass with respect to one another, displacing a geometrical centre with respect to one another, and changing an orientation with respect to one another; a communication module for exchanging data with at least one other, similar element, said data comprising at least one position status; a data processing module, functionally coupled to said communication module for processing data from said communication module; an energy module functionally coupled for providing energy to at least said displacement module, said communication module, and said data processing module, wherein in operation said element is in physical contact with at least one other, similar element with its exterior surface at least partly in contact with at least part of an exterior surface of said at least one other, similar element, and wherein said data processing module comprises software which, when running on said data processing module, comprises: retrieving a set position, selected from place and orientation and a combination thereof, for said element via said data communication module; retrieving current position information; calculating at least one motion instruction for said motion module for moving said element from said current position to said set position by moving its exterior surface over said exterior surface of said at last one other, similar element; and providing said motion module with said at least one motion instruction.

In accordance with embodiments, elements comprise at least one exterior surface and when displacing, the surface displaces substantially parallel to an abutting exterior surface of another, similar element.

In accordance with embodiments elements may be provided with a position sensing part functionally coupled to data processing module.

In accordance with embodiments said position sensing part comprises a relative position sensing part for sensing the position of said element with respect to at least one other, similar element. Such an element may be in contact with said element.

In accordance with embodiments said position sensing part comprises a local absolute position sensing part for sensing the local position of said element with respect to a location within a group of elements.

In accordance with embodiments said position sensing part comprises an absolute position sensing part for sensing the global position of said element.

In accordance with embodiments an element comprises an orientation sensing part functionally coupled to data processing module.

In accordance with embodiments, said orientation-sensing part comprising a relative orientation sensing part for sensing the orientation of said element with respect to at least one other, similar element which is in contact with said element.

In accordance with embodiments said orientation-sensing part is adapted for sensing the orientation of said element with respect to a force field, for instance a gravitational force field, en electrostatical force field, a magnetical force field.

In accordance with embodiments said motion module comprises a rail with displacer, with a displacer running in or on said rail.

In accordance with embodiments said rails runs in at least two dimensions, in particular on/in exterior surface.

In accordance with embodiments, elements may comprises a shared displacer.

In accordance with embodiments said motion module comprises at least one piezo element ("stepper").

In accordance with embodiments said element comprises walls defining the outer boundaries of an element.

In accordance with embodiments, at least one exterior wall may be provided with a seal for sealing space between surfaces of elements. This, it is possible, using elements, to build a leak-tight, or even an air-tight construction.

In accordance with embodiments said seal has an engaging position and disengaging position.

In accordance with embodiments said seal is circumferential with respect to a wall of an element.

In accordance with embodiments, at least one wall comprising a planar surface part.

In accordance with embodiments, an element comprises at least one functional surface, for instance comprising a photovoltaic element.

In accordance with embodiments, said element comprises a container space in said element, in particular a closeable container space.

In accordance with embodiments said container space comprises a closure or an actuator for closing said container.

In accordance with embodiments said actuator is functionally coupled to said data processing module.

In accordance with embodiments, said element comprises at least one actuator for selectably operating said motion module, in an embodiment for retracting said motion module within said element.

In accordance with embodiments said actuator is functionally coupled to data processing module.

In accordance with embodiments, said data processing module may comprise any one selected from: a memory, a master-slave setting, a dynamic master slave setting, a building plan, time-based position instructions, a time keeping part.

In accordance with embodiments, the size of the elements is 10 cm down to 0.1 micron, in particular 1 cm down to 0.5 micron, more in particular 1 mm down to 0.5 micron, specifically 100 micron down to 0.1 micron.

The invention further pertains to a method for conveying material, comprising providing said material in at least one element described above.

The invention further pertains to an element comprising: at least one exterior surface; wall; allowing displacement; at least one holding module: for maintaining a position of said element with respect to/onto a similar element; at least one motion module for displacing said element with respect to other, similar elements substantially over said exterior surface; the motion module can also be a separate part shared with at least one other element, see rail for example; linear displacement, rotation, displacing of centre of mass with respect to one another, change of orientation with respect to one another; changing distance of said element with respect to other, similar elements; telescope part may be provided on the element; a communication module for exchanging data with other, similar elements; in an embodiment, data comprising orientation, position with respect to others, fixation, external physical parameters like temperature, sensor data, time, wireless; a data processing module; an energy module, for instance for providing energy to said motion module, motion-restriction module, said communication module, said data processing module, using for instance electromagnetical radiation; wireless transfer, energy from other, similar element, storage.

In accordance with embodiments, said elements are in physical contact with one another; in particular, at least part of said walls/external surfaces is in physical contact with one another. In particular, an area of contact (point/line no area) is defined; motion module in contact, holding modules in contact; forces pressing one construction element onto another can be taken up via displacement module, holding module, at least part of said exterior surface.

In accordance with embodiments, the neighbourhood is defined as one beyond in an embodiment two beyond said element.

In accordance with embodiments, an element is at least partly produced using for instance 3D printing. In accordance with embodiments, plant cells may be used for producing a "wood" surface.

In accordance with embodiments, elements in an assembly of elements work together, wherein said elements have a master/slave setting, in particular a dynamic master/slave setting.

Embodiments further relate to a game assembly, comprising a system described above, and a computing device in communication with at least one of said elements, said computing device running a computer program which, when operating on said computing device, performs the following: requesting a user input for defining a start configuration of said elements; requesting a user input for defining an end configuration of said elements; and communicating said start configuration and said end configuration to at least one of said elements.

Embodiments further relate to a computer implemented game, comprising a computer program which, when running on a computer device, performs the following: defining in a memory a set of at least three elements, each element comprising: a centre point in said element, a relative position and an orientation; a motion-guiding function, coupled to said centre point and defining a predefined trajectory over said element; a motion function defining displacing the centre point with respect to a second centre point of one of the other elements using the motion-guiding function of that other element; a motion-restriction function, adapted for limiting the displacement of said centre point with respect to the second centre point to at least one trajectory selected from the group consisting of said predefined trajectory and a second predefined trajectory of said other element, wherein said motion-guiding function of at least two of said elements define a functionally coupling between elements for enabling said motion function to displace the centre point of a third, displacing element which is in contact with one of the other two elements away from the centre point of one of the other two elements and towards the centre point and in contact with the other of the other two elements; the computer program also performing the following: sensing other elements; defining in a memory a start configuration of said elements; and defining in a memory an end configuration of said elements.

Embodiments further relate to a method for playing a game, comprising providing a computer program which, when running on a computer device, performs the following: defining a set of at least three three-dimensional elements in a memory, each element having a centre point and at least one face; defining in a memory a start state of said set of elements, by a start outer boundary of said set of elements, and a at least a position of each element with respect to said outer boundary; defining in a memory an goal state of said set of elements, which goal state is different from said start state and requiring displacement of at least one element; providing a function toolbox comprising: a set of motion-guiding functions, said motion-guiding functions coupled to said centre point and defining a predefined trajectory over said element; a set of motion functions defining displacing the centre point with respect to a second centre point of one of the other elements using the motion-guiding function of that other element; a set of motion-restriction functions, adapted for limiting the displacement of said centre point with respect to said second centre point to at least one trajectory selected from the group consisting of said predefined trajectory and a second predefined trajectory of said other element; a set of sensor functions providing information on the environment of an element; the computer program also performing the following: presenting said function toolbox to a user and enabling said user to select at least one function from said function toolbox for each element; providing for each element an element computer program operationally coupling said selected functions, and which element computer program when executed performs steps or processes, each step or process: allowing collecting sensor input, relative position input, and allowing motion; and running on each element said element computer program.

In particular the presence of another element in contact with at least one face.

In accordance with embodiments, said method further comprises defining in a memory a goal state of said set of elements by an end outer boundary of said set of elements.

In accordance with embodiments, said method further comprises defining in a memory a goal state of said set of elements by defining for at least one element a requirement with respect to said set of elements.

In accordance with embodiments, said method further comprises defining in a memory a goal state of said set of elements by defining for at least one element a requirement with respect to at least one element of said set of elements.

In accordance with embodiments, said method further comprises defining in a memory a goal state of said set of elements by defining for at least one element a requirement with respect to at least one specific element of said set of elements.

Embodiments further relate to a game comprising shape-shifting an object of elements from a first shape to a second shape, wherein the position of at least one element with respect to at least one other of said elements changes during said shape-shifting. The elements can in fact form construction elements for assembling a physical structure, for instance a building, a home, or the like.

The person skilled in the art will understand the term "substantially" in this application, such as in "substantially encloses" or in "substantially extends up to." The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like if used in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The construction elements herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

Embodiments further applies to construction element or parts thereof comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

DRAWINGS

Embodiments of the invention will now be described, by way of example only, with reference to the accompanying schematic drawings in which corresponding reference symbols indicate corresponding parts, showing an embodiment of a construction element, and showing in:

FIGS. 1A-1F a perspective view showing several subsequent steps of an example of mutual displacement of three elements.

FIGS. 2A-2E a perspective view of several subsequent steps of another example of mutual displacement of in this case four cube-shaped elements.

FIGS. 3A-3O a perspective view of several subsequent steps of another example of mutual displacement of in this case 18 cube-shaped elements.

FIGS. 4A-7C Relate to various possible motion modules, motion guiding modules, motion-restriction modules and combinations thereof, in which in particular FIG. 4A-4L shows a combined motion module, motion-guiding module and motion-restriction module;

FIG. 5A-5C show a motion module based upon magnetic forces;

FIGS. 7A-7D show an alternative combination of motion module, motion-guiding module and motion-restriction module based upon piezo elements;

Figure 2A:
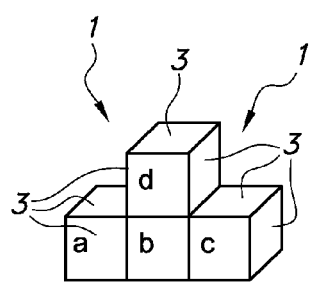

The drawings are not necessarily on scale.

DESCRIPTION

In this detailed description of embodiments, elements have a general reference number 1, and will individually be indicated with letters a, b, . . . in order to distinguish them from one another. In the discussion, the reference number 1 will be left out when referring to element a, b, etc. The elements a, b, . . . can be identical. They can also differ in shape or functionality. The elements have a centre 2 (only indicated in element b of FIG. 1A). This centre can in general be a centre of mass (also referred to as "centre of gravity"), or alternatively a geometrical centre (also referred to as "centroid") of an object. If an element has a uniform density, the centre of mass is the same as the centroid.

Each element 1 can have one or more faces 3 that are adapted to allow an element 1 to be positioned on or against another element 1. These faces are indicated in FIG. 1A only. In particular, the one or more faces 3 can be adapted to allow elements 1 to displace with respect to one another with the surfaces of face 3 in contact or almost in contact. In this detailed description, however, other options will also be demonstrated.

First, some examples of elements and displacement of elements with respect to one another will be demonstrated.

In FIGS. 1A-1F, three elements a, b, and c are of a triangular shape. In this embodiment, each element 1 has at least one face 3 with a surface that allows the elements to be in contact with one another and to displace with respect to one another over the surface of these faces 3. This at least one face 3 of elements 1 thus have a surface 3 that is adapted to allow for an element a, b, c to displace over another element a, b, c. In element b, a centre 2 is indicated. For the discussion, the nature of this centre 2 is not important: A centre 2 has a fixed position in its corresponding element 1.

FIGS. 1A-1F show an example six subsequent steps of element c with respect to elements a and b. Elements a and b remain at the same position and orientation with respect to one another.

In FIG. 1A, a starting position of elements a-c is depicted. Element c starts from a position in which it is in contact with the surface of one face of element a only. Element a starts to move to the right side of the paper. In FIG. 1B, element a is moving to the right and is positioned between elements b and c, and continues to move to the right-hand side of the drawing. In FIG. 1C, element c is no longer in contact with element a, Element c now is in contact with the surface of a face 3 of element b only. Element c continues to move to the right side over the surface of face 3 of element b, and in FIG. 1D it arrives at an end of the surface of face 3 of element b. Element c is able to move on to the right and in FIG. 1E, it arrives at a position depicted. In this position, halve the area of the surface of face 3 contacts the surface of face 3 of element b. Element b now starts moving in a direction into the paper and cross with respect to the earlier direction.

In FIG. 1F, element c is shown in a rest position. In this position, a surface of face 3 is only partly in contact with the surface of face 3 of element b.

In the example of FIGS. 1A-1F, the elements a-c can be in a gravitational field, with element a resting with the surface of its face 3 on the corresponding surfaces of faces 3 of elements b and c.

The elements exert forces on one another using the motion modules, motion-guiding modules and/or motion-restriction modules. These forces can be exerted mechanically, using electromagnetic forces, using chemical forces, and any other physical forces, or a combination of these. In case of a chemical force, a potential use of a reversible process which for example does not leave traces on a surface may prolong the usability for future movement along such a surface. When describing the movement phases it must be understood that movement may vary in speed and acceleration. Even an interrupted sequence of move, no move and move again is possible. When moving or not moving an element may withstand one or more forces exerted upon that element (internal or external) selected from the group consisting of for example gravitational force, mechanical force, electrical force, chemical force and climate forces. A potential use for an element is for example on a different planet, in a fluid or in a vacuum like space.

Alternatively, element a is held on elements b and c via a mechanical means or via for instance magnetic force. In this example, the surfaces of the faces 3 of the elements a-c may actually be in contact with one another. Below, various embodiments of motion modules, motion-guiding modules, and motion-restriction modules are illustrated and which may be used for the motion shown in FIGS. 1A-1F.

In the example of FIGS. 2A-2E, four elements 1, indicated a-d, are shown. These elements a-d displace with respect to one another. The elements 1 in this example are identically shaped cubes. In this example, the faces of the cubes are solid surfaces and the cubes rest on each other's solid surface and can be under the influence of a gravitational field. A starting position of the elements a-d is indicated in FIG. 2A. The displacement action indicated in FIGS. 2A-2E is repeated and the construction of four elements a-d as a whole moves to the right.

In FIG. 2A, element a starts displacing along a surface of face 3 of element b in an upward direction. Element a thus displaces towards element d. In fact, centre 2 of element a moves away from the centre of element b and gets closer to the centre of element d when it moves in the upward direction.

Figure 2B:
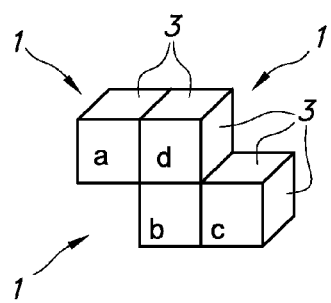

In FIG. 2B, element a arrived at a position closest to the centre of element d. Element a now no longer contacts element b. Now, elements a and d together start displacing to the right side of the paper. This may be done in several ways: Element a may couple to element d, and a motion module of either element d or element b starts acting on element d in the direction of (intended) motion. This results in a motion of elements a and d. When elements a and d displaced so much to the right that a surface of face 3 of element a now contacts part of the face 3 of element b. Now part of a motion module of element b may engage part of a motion module of element b. In such a stage, the combined motion of elements a and d may be caused using the motion module of element a, element b or element d, or combinations of these motion modules.

Figure 2C:
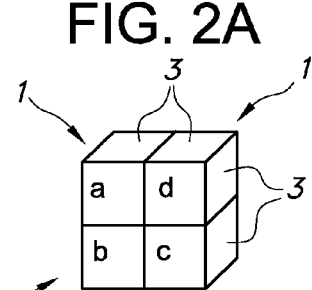
Figure 2D:
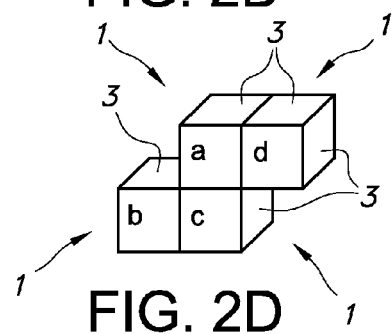

In FIG. 2C, elements a and d are exactly on top of elements b and c. Elements a and d continue to displace together to the right until the situation depicted in FIG. 2D is reached. There, elements a and d stop. Now, element d starts displacing in a downward direction, with its centre moving away from the centre of element a and towards the centre of element c. Again, this motion can be caused by the action of a motion module of element a, of element c or element d, or a combined effort of any of these motion modules.

Figure 2E:
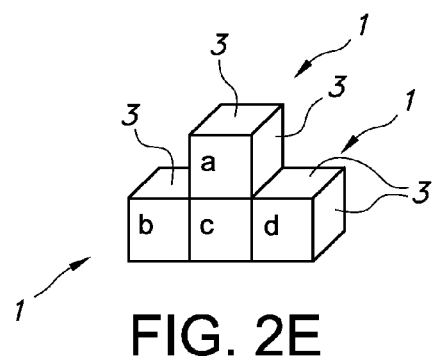

In FIG. 2E, the elements a-d are in fact in a similar external configuration. Thus, in fact the same construction as in FIG. 2A results, but displaced to the right with a displacement which equals the length of a side of an element. Next to having displaced elements a-d another additional aspect of the invention will be described: transportation. When an object is temporarily coupled to element a, for example placing a basket with material on top or inside element a; element a now uses it's own or the other elements movement ability to transport this other object from one position to another position. Alternatively, an element may comprise a build-in storage space. Thus, the element may functionally be or comprise a container for holding material.

Figure 3A:
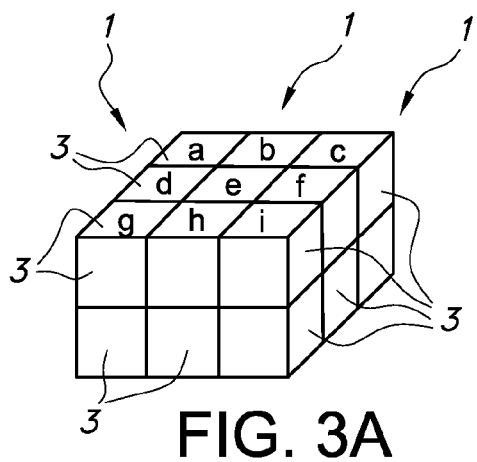
Figure 3B:
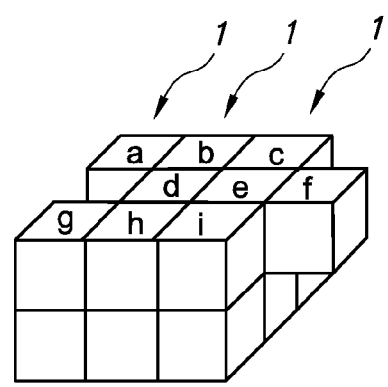
Figure 3C:
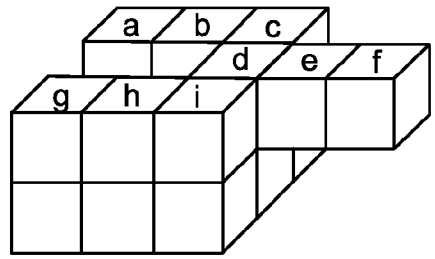
Figure 3D:
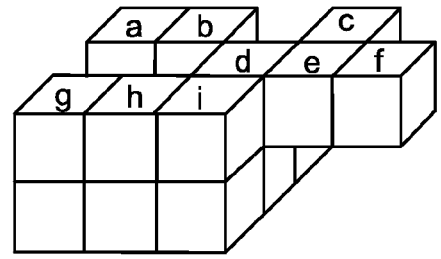
Figure 3E:
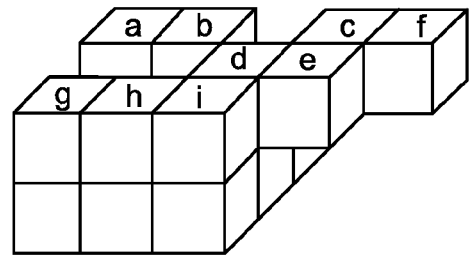
Figure 3F:
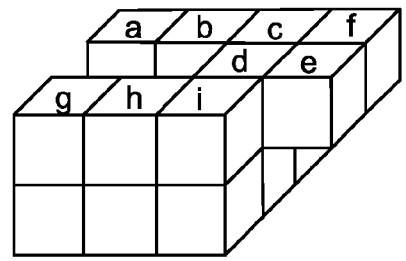
Figure 3G:
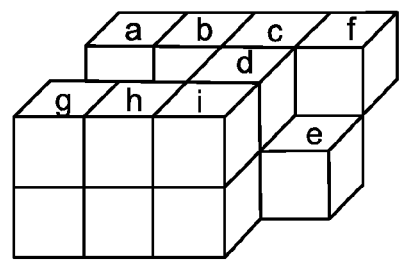
Figure 3H:
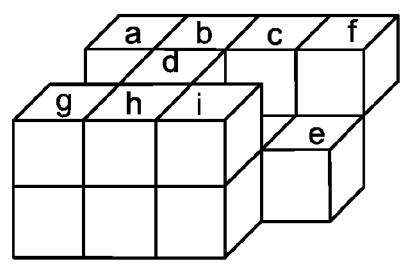
Figure 3I:
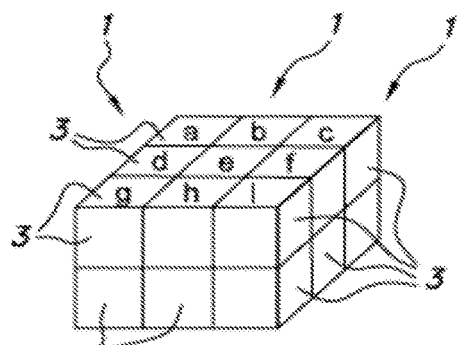
Figure 3J:
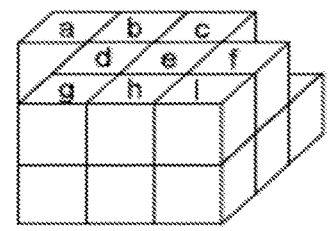
Figure 3K:
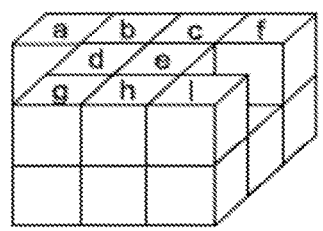
Figure 3L:
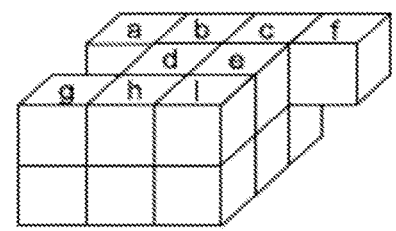
Figure 3M:
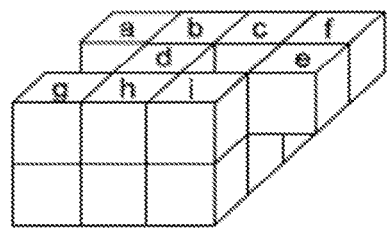
Figure 3N:
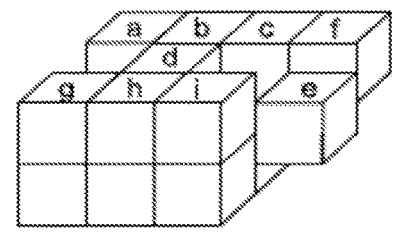
Figure 3O:
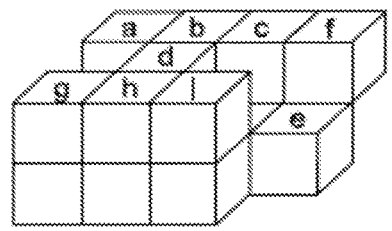

In FIGS. 3A-3O, a construction of 18 elements 1 in fact change changes its shape by moving elements with respect to one another, if all the elements have an identical shape. The functionality of the elements may differ. Thus, the functionality of the new construction may also differ.

In the arrangement of 18 elements 1, the top 9 elements are indicated a-i. In order to get to a new arrangement of these elements depicted in FIG. 3H, many schemes are possible. FIGS. 3B-3G show several intermediate arrangements of the elements. One of these possible schemes is to first displace the complete row d-f two positions to the left (FIG. 3C), then displace element c to the left until its centre is closest to element e (FIG. 3D), then displace element f in a position where its centre is closest to the centre of element c (FIG. 3E), then displace the elements c and f to the left until elements b and c touch (and may lock) (FIG. 3F). Then displace elements e down until it reaches the position shown in FIG. 3G. This can be done using the (part of) motion module of element d, f, the element below element d, end element e, or a combined action of a selection of these elements. Next, element d moves to the left until the configuration of FIG. 3H is realized. This scheme thus requires 7 steps, displacing a total of 4 elements (c, d, e, f) a total of 12 positions: when going from FIG. 3A to FIG. 3B, a displacement of 3 positions occurs, from FIG. 3B to FIG. 3C 3 positions, from FIG. 3C to FIG. 3D 1 position, from FIG. 3D to FIG. 3E 1 position, From FIG. 3E to FIG. 3F two positions, from FIG. 3F to FIG. 3G 1 position, and from FIG. 3G to FIG. 3H again one position. This adds up to a total of 12 positions. The same end situation or configuration of elements can also be reached in another way. This is shown in FIGS. 3I-3O. First elements a-c are displaced together 1 step along elements d-f to the left as in FIG. 3J. Subsequently (FIG. 3K), element f is displaced in the direction into the paper until its centre is at its closest position with respect to the centre of element c.

Next, in FIG. 3L elements a-f move as a group 1 position to the right. Next, element e moves to the right (FIG. 3M). FIG. 3N depicts the intermediate position of element e while moving down; in this position element e uses element f and in parallel or sequentially uses the element on the left side of element e. Subsequently the composition of FIG. 3O is again realized. This scheme requires five steps (not counting FIG. 3N), displacing 6 elements (a-f) a total of 12 positions. The last scheme may require a smaller amount of (kinetic) energy, for instance element d has now been displaced only 1 position.

When comparing end positions and the way that theses end positions are accomplished, several aspects can be taken into account. At a highest level, the performance of the system of elements as a whole may be evaluated. At a lower level, the performance for a group of elements may be evaluated. At the lowest level, the performance of a single element may be the subject of performance evaluation. These aspects for instance may have to do with the (in) equality of elements, element limitations, principles on how to handle forces acting upon an element and inter-element, required intermediate positions, principles used for navigation or problem solving, the speed at which a certain configuration of elements is being reached, energy consumption. To achieve a certain position fuzzy logic, artificial intelligence, data mining techniques, machine learning, (path finding) algorithms proportional logic, or other methods known in the field may be used. Elements may be steered or controlled from one or more central points. Alternatively, elements may be adapted to make their own decisions. In yet another alternative, elements may use distributed control. Thus, several degrees, levels or combinations between being steered or controlled and making own decisions are possible. An element can have agent functionality and may learn from the feedback of its environment. An element may investigate, by computation, several potential actions or sequence of actions it is able to make. Subsequently, the element may determine either for itself, or for one or more other elements, which action has the highest benefit to the element, or to one or more other elements. It may then select that action or sequence of actions, and execute that action or sequence of actions. Furthermore, the timing of an action or sequence of action may be taken into account: Elements may be planning their sequence of actions wherein the planning may take into account other elements. Elements may receive only part of the information needed to accomplish a final configuration of elements and therefor need to communicate to other elements or devices. Client-server, master-slave, peer-to-peer, push or pull systems, polling, swarming- or other (hybrid) methods/technology may be used or adapted. Sometimes parallel movement (of individual elements or groups of elements) occurs next to sequential movement. So the movement of element d and element e to their final position could have occurred in one step from FIG. 3F directly to 3H at the same time instead of sequentially as described in the current FIG. 3F followed by 3G (movement of element e) and 3H (movement of element d). Sometimes a certain configuration of elements can only be reached by a method where one element is helping another element. A helper element can temporarily be inserted and used, then retracted from the other elements and thus not have a position in the final configuration of elements at all. Due to the reusability of the elements a large number of configurations of elements can be achieved over time. Well-designed elements do not have to be recycled but can be re-used, even for different purposes. This lowers the burden on our natural environment in several ways.

A set of elements can assume a first configuration, and then move with respect to one another into a second configuration. Thus, the set of elements together are first in a first shape, and then in a second shape. This is also referred to as 'shape shifting'. In this process, the elements may be reused.

This shape shifting by displacing reusable elements allows for example the formation of a table from a group of elements. When at a later stage this table is not required any longer, at least one element from the group can be instructed to exert some form of control over, or to communicate to, at least one other element of the group. This can be direct, wireless, but may also be accomplished by for instance a messenger element which can be inserted or added and which transfers the message to an element out of the group and then returns. A task of the group of elements may thus comprise changing its current shape, a chair, into a table. Thus, the elements start moving with respect to one another. The requirement of a chair and the table shape shifts itself to a chair according to input given or already available at an element. Thus the task of reusing the elements is executed by the elements. Interaction with a human being exerting physical control, for example picking up, stacking, or replacing one or more elements, is not needed. This is a different method than building constructions with for instance Lego, in which human interaction is required. It is clear in this example that some form of intelligence or rules regarding mechanics, construction, architecture may be applied by an element or given to an element by a device, such that a person can actually use the chair to sit upon without the chair falling apart due to for instance the disintegration or disconnection of connected elements.

The elements can be physical at various scales. First, their size can vary. Their size may be comparable to playing blocks. Thus, an element may have a cross section of between 1-5 cm. An element may be a building block for constructing a building. In such an instance, a building block may have a cross section of about 5-50 cm. The elements may also be so small that the human eye can hardly discern the individual element. In such an embodiment, an element can have a diameter smaller than 1 mm. In particular, the diameter can be smaller than 100 micron. This may require the use of nanotechnology and for instance molecular or atomic motors. These elements can be used to build parts of this invention, as can larger elements the size of bricks or prefab concrete elements that may form a building. When leaving out the physicality of the elements, the elements can be simulated in order to determine or predict whether a configuration of elements can be achieved. In order to achieve a goal state when starting from a begin or start state, an element may need a combination of a program or app, with functionality which allow some functions to be performed. These functions steer actuators available in an element. Available sensors may give the element or the program input, potentially resulting in a different outcome of a function or a group of functions. These attributes and interactions as such may be known in the field of robotics.

From this a game or simulation, may be construed, which may be using physical or virtual elements or a combination of both. In such a game, it can be the task of a player to select the right program and the right functions/functionalities in order for elements to achieve a certain goal state out of a begin state. This game can be played by a human being alone, or by a computer. It may be played by at least one human being against at least one other human being or against at least one other computer, or a combination thereof.

Specific parameters measure the success; parameters like consumption of energy, speed, amount of moves of an individual element or of the group as a whole, amount of memory/cpu usage, strength of the goal state, or time required to reach the end state. When applying this with a certain degree of autonomy of elements and randomness for example by using artificial intelligence, the outcome may in advance not be known to a player. An overkill of regulating constraints to an element may restrict an elements ability to respond well to other situations/goal states; there may also be a trade-off between specialization and generalization. A player can for instance design on a game device a certain goal state and give certain elements selected properties: a selection from a group of programs, of actuators or motion modules, of sensors, of functions, of energy systems, and of communication systems. It must be understood that these properties of an element may act on other elements or devices. The design can be used by at least one element. The design is provided in part or as a whole to one or more elements and the elements start the displacement and depending upon the given properties the design, actually being a goal state can be accomplished or not. Changing the design allows for the elements to try to achieve another goal position. The elements can be physically or virtually, and displace themselves according to the given properties. Elements may be configured in order for the elements to exchange at least one property or functionality with one another or with another device. Elements may comprise memory in order to recall previous situations or compute potential future situations. This as such is known in the field of computer science. A goal state can be defined in different ways. For instance, the outer boundaries of a set of elements can be used as a goal state. For example, the end shape is a cube, or a plate.

The goal state may be functionally defined at element-level. For example, each element must have at least one face in contact with another element; each element must have at least 2 faces free.

A goal state may also be a list of locations, absolute or relative to other elements, of elements, or for instance specific elements have predefined end positions, again either relative, absolute, or a combination of both.

A goals state may also be represented by a mathematical function, general or mathematical demands or requirements on an assembly of elements, for instance, the assembly or configuration of elements must have a particular plane of symmetry, a hollow space inside, a defined circumference, a defined volume, number of layers, etc.

A goal state may also be functional. Elements having a defined functionality or property are at a certain position. Or the position should be such that the function is optimized. For instance, elements having a photovoltaic face should be located and/or positioned such that their production is maximized. The goal state may even evolve, change or be modified, even during the motions of elements towards the original goal state. The goal state may for instance change due to environmental influences, like day/light rhythm, temperature, etcetera, or may be time-dependent. A goal state may also be a negative definition, or be an exclusion.

Additionally, outside interaction may be possible. For example, inserting or removing an element to or from a certain state. This may be done physically for instance by a human being by using his/her hand. When done by taking into account how elements may attach/interact to one another, an element adjacent to a newly added element may notice/sense this interaction and use this for its own and potentially for other elements' behaviour in the configuration of elements. When going back to the example of designing a goal state on a device, the inserting or removing of at least one element may be taken into account by that device as well. Alternatively, a predesigned goal state may be used.

An example of this is a child designing a castle using the elements. Imagine the child using a computer device with a display, for instance an iPad. Suppose a castle is constructed using elements. Physically, the castle formed in a room by action and displacement of the elements themselves. After or during said formation, the child extends the castle by physically adding two more elements. The app running on the iPad receives information from an element forming part of the castle that the two elements are added. the child may save his/her altered version of the castle. When done playing, the child instructs the elements by means of the app to move to a certain begin state. Such a begin state may be compact so that his/her room may be used for other purposes. This example may then use wireless communication or multiple iPads, which are used to make a joint configuration of elements even at remote or uninhabited locations (like on planet Mars).

Communication may replace a certain type of sensor functionality. An element may use a sensor to detect only its direct neighbour. Alternatively, a sensor may be able to detect another element two positions further, or an element may ask an other element if that other element is in contact with the element two positions further. Sensors can use contact/proximity detection by using the electromagnetic or the audio spectrum.

Another example is when two iPads play a game in which reaching a certain given goal state physical or virtual is the purpose of the game. As described earlier, this can be accomplished by selecting the right properties, functionality or tools for the elements. In this game there may be limits on certain properties or limits on how many different element configurations can be used for a certain goal state when playing a level of that game. An approach akin to the program Minecraft or other virtual worlds can be accomplished with for instance the difference that the current elements may physically build what is virtually designed when using design rules applicable to a physical element.

In FIGS. 4A-7C, various embodiments of motion modules, motion-guiding modules and motion-restriction modules are illustrated. These embodiments are examples showing ways to work the invention for physical elements 1.

Figure 4B:
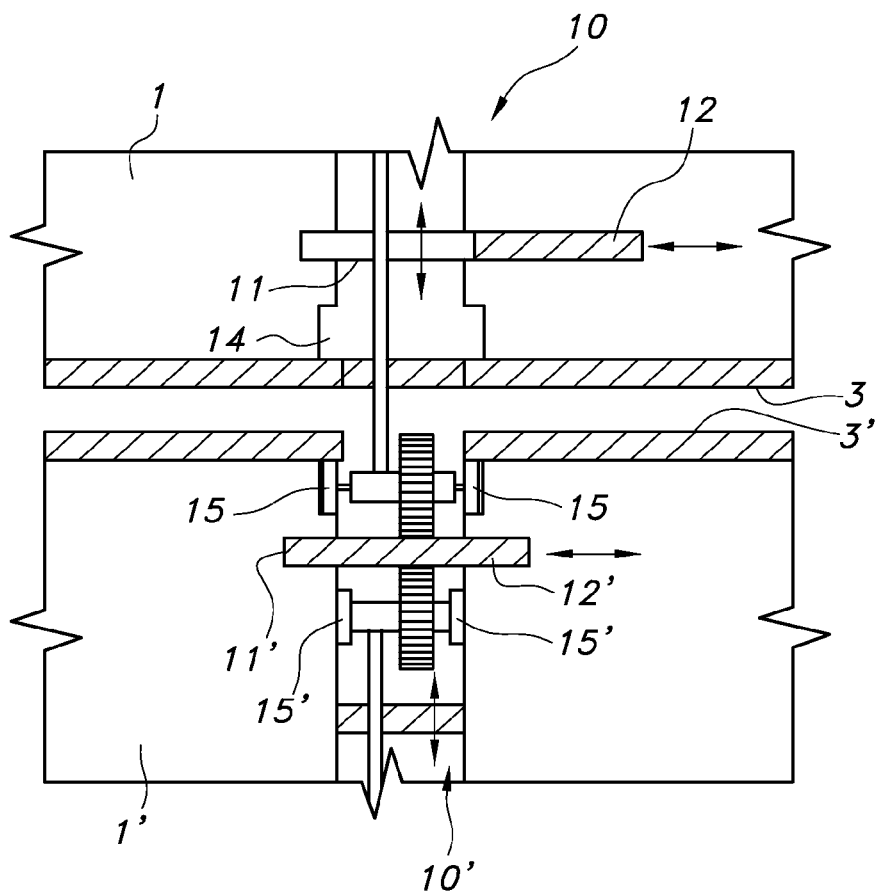
Figure 4A:
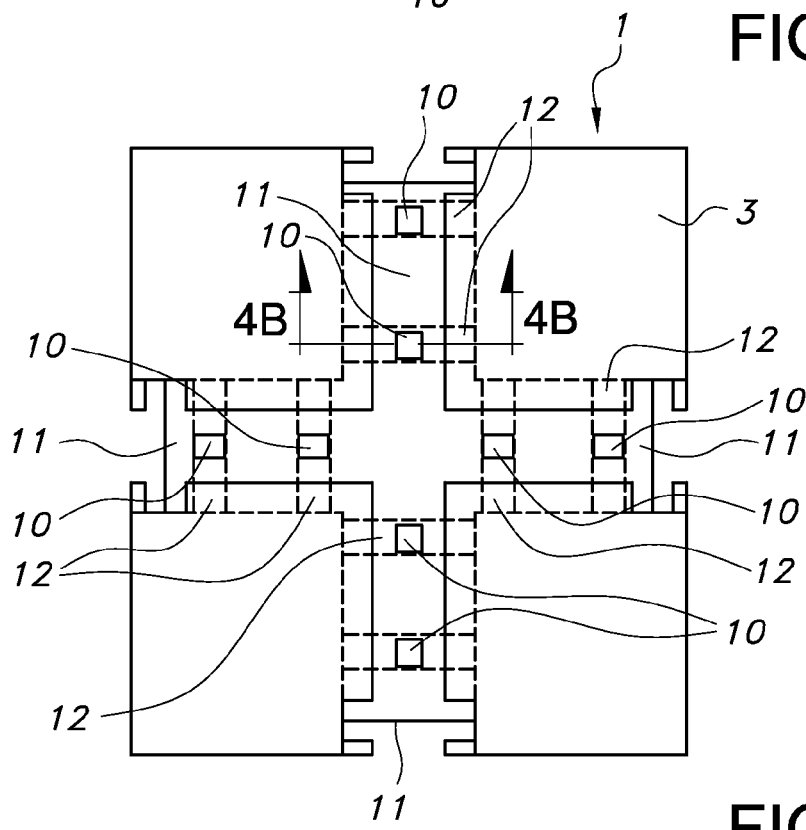
Figure 4C:
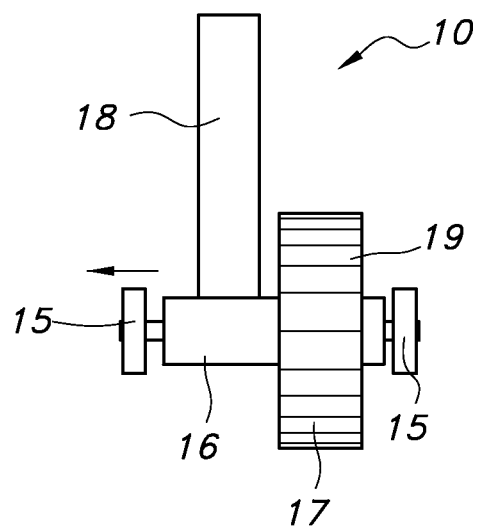

In FIGS. 4A-4C, a cross-sectional view, detail and top view are shown which illustrate a mechanical solution that combines a motion module, a motion-restriction module and a motion-guiding module. In FIG. 4B, a cross section is shown of parts of two elements 1, 1' that are positioned on top of one another. Faces 3 are almost in contact. In fact, if their surfaces have little to almost no friction, the surfaces can in fact be in contact. Otherwise, one of the three modules (motion, motion-guiding and motion-restriction) will cause a little distance between the faces 3.

In the embodiment of FIGS. 4A-4C, an embodiment of part of two elements 1 is schematically shown. Part of the motion module of element 1 is a retractable wheel 10. Another part of the motion module is a track 11. Element 1' has in this embodiment the same modules. FIG. 4A shows one element in top view, and FIG. 4B shows a cross section of FIG. 4A as indicated, but with a second element on top of it and also cross sectional view.

In FIG. 4B, the retractable wheel 10 of element 1 extends and engages track 11' of element 1'. Retractable wheel 10' of element 1' is here in its retracted position. Retractable wheel 10 of element 1 in its extended position engages track 11'. In element 1, in order not to hinder the retractable wheel 10, a slidable cover 12 is in its inactive position. It slides here to the right in the drawing. Element 1' has its slidable cover 12' closed. In this way, the cover 12' together with track 11 provides a continuous track. The track is sunken with respect to the surface or face 3.

Figure 4D:
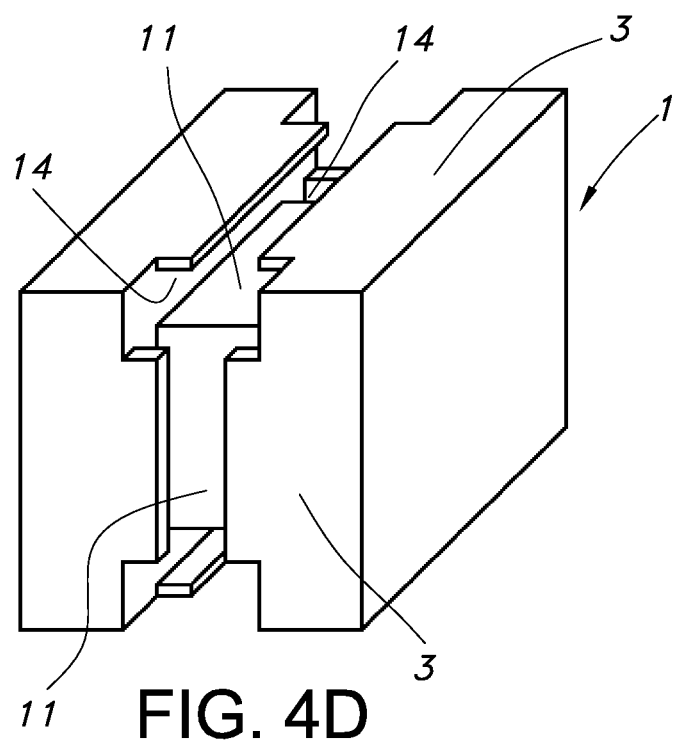

In FIG. 4A, only one face of an element is shown. In accordance with embodiments, of which parts are already discussed above, the element 1 may be a cube. Such a cube can be provided with six similar faces. In fact, the six faces may also be identical. In the embodiment of FIG. 4A, a face carries a cross shaped track. Here, the centre of the cross is located at the centre of the face. In accordance with embodiments, the element may have further faces that are provided with a similar, cross-shaped track. In order for elements to be able to displace with respect to one another in a flexible way, the track on one side functionally connects to the track on another, neighbouring face. In the example of FIG. 4D element 1 has one single, closed, sunken, track that runs all around four sides or faces of the element 1. In this drawing, groove 14 differs from the embodiment of FIGS. 4A and 4B in that it has a wall that runs equal with the surface of track 11. In the embodiment of FIG. 4A, the element has at least two tracks. These tracks have two crossings at opposite faces, and in FIG. 4A one of the crossings is visible.

Now suppose two elements 1 of the type shown in FIG. 4A are positioned with their face in contact. In order for a third element having the wheel as shown in FIG. 4B to move over the face of one element 1 and continue over the neighbouring element 1, A similar neighbouring element must have a similar sunken track at the same level to allow the moving module to traverse the two gaps (each element causing one gap. It may also be seen as one single gap).

Figure 4E:
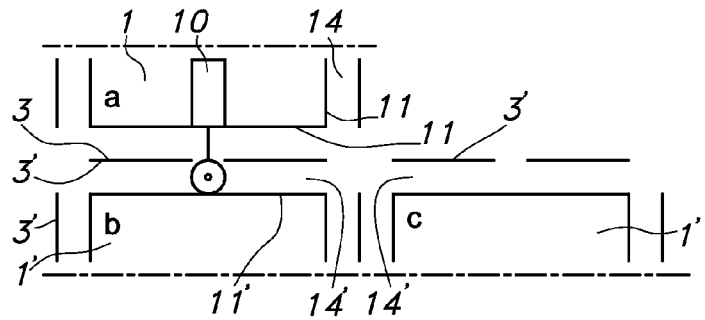
Figure 4F:
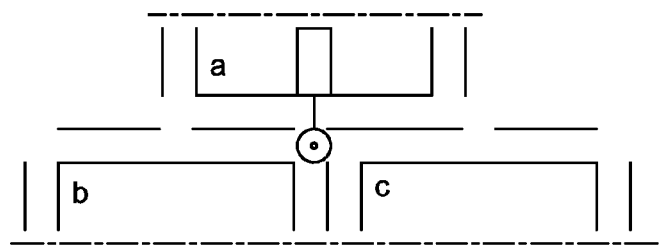
Figure 4G:
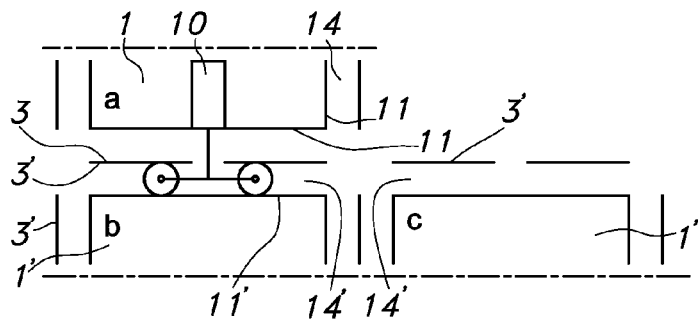
Figure 4H:
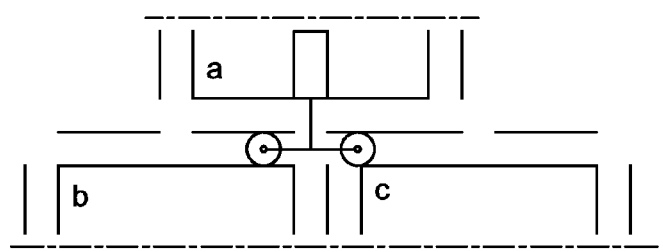

FIGS. 4E-4L schematically depict 3 elements 1; a, b and c, in a cross-section parallel through the centre of the tracks of the elements. The gaps in the lines resemble the gaps of FIG. 4D of the closed track around the element. FIG. 4E shows that the extended wheel module 10 of element a is running in the track of element b. FIG. 4F depicts the situation where the wheel module 10 tries to traverse the first gap. It is obvious that there is no traction by which the wheel module can displace element a any further in the direction of element c by itself. One or more helper elements 1 attached to element 1 a may in this case solve that problem. Potentially the element 1 of FIG. 4D has a different motion module 10: a motion module 10 with multiple wheels (FIG. 4G). First such a motion module 10 extends towards the track. Subsequently the motion module 10 extends its wheel base length and two wheels will be following the track. In this embodiment, a frame connecting both wheel axes extends. The wheels in FIGS. 4G and 4H may have half the width of the single wheel of FIG. 4E. In that way, these wheels if the embodiment of FIGS. 4G and 4H can slide out of one another and fit into the track. The distance between the rotational axes those two wheels is such that the two wheels span the two gaps, which is depicted in FIG. 4H: When one wheel has no traction, the other wheel has traction. These two wheels may be jointly or independently of one another use a motorized part.

In another embodiment, multiple motion modules 10 are provided at a certain distance from one another. This allows for movement while one of the motion modules 10 crosses the two gaps and another motion module 10 moves over track 11 (FIG. 4I-L).

Figure 4I:
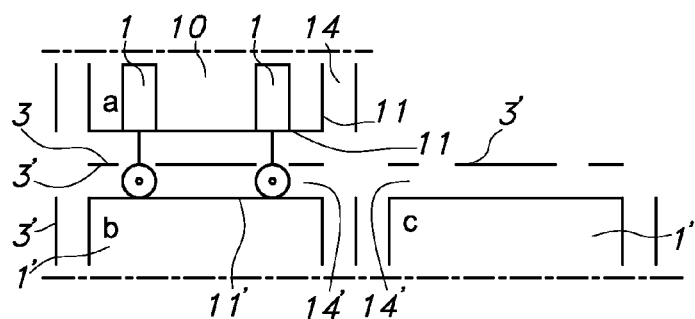
Figure 4J:
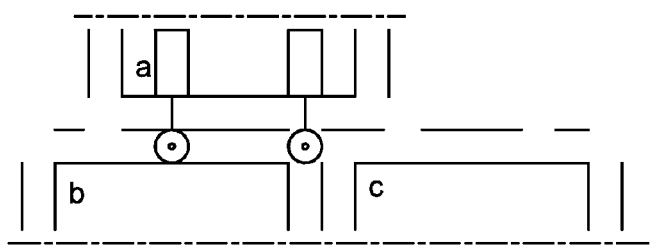
Figure 4K:
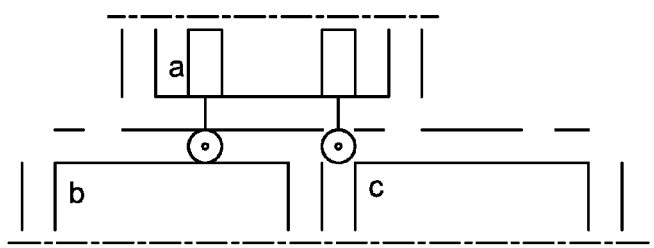
Figure 4L:
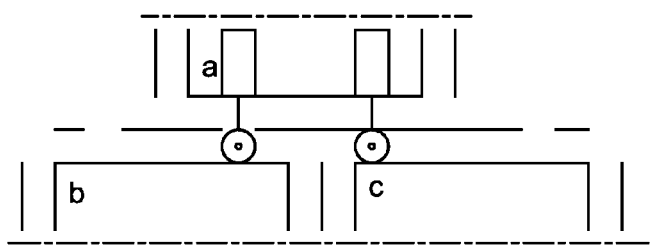

FIG. 4I shows an element 1 having two extended motion modules 10 which are moving element a on element b and towards element c. In FIG. 4J the right wheel has no traction any more, due to the first gap. The left wheel uses its power to continue the displacement of element a. In FIG. 4K the second gap is reached. Still, the left wheel engages element b and pushes element a further towards element c. In the situation of FIG. 4L, both wheels have traction again: with the left wheel engaging element b and the right wheel engaging element c. The wheels may change roles if element a is completely on top of element c.

In the embodiment of a cube-shaped element, in fact three continuous tracks are provided that encircle the cube and that cross one another. Each track usually crosses the other track at two crossings. In fact, more tracks are possible that each have other advantages. In particular, an embodiment will be demonstrated in which one or more tracks can be made over a face at almost each chosen path over the face. In this document, such an embodiment is provided using magnetic parts. Specific other layouts of track that are mentioned here are providing a face with two sets of two tracks. Each set crosses the other set. The tracks of a set can be provided symmetrically with respect to the centre of a face. Thus, in fact the tracks are laid out in the shape of a #-sign. When providing a cross-shaped track, usually an element, when it is a cube, can only move on another element when the faces al both elements and that are parallel to the direction of motion, are in-plane. Thus, when another motion is required, the help of another element may be needed. An advantage of the cross-shaped track is the relatively simple layout. Furthermore, motion can be provided using a single motion module on each face, at the crossing of a track. Thus, in the embodiment of a cube, six motion modules may be needed to enable full motion capability. In the embodiment of FIG. 4A, each track 11 is provided with four motion modules. This may be needed to provide sufficient traction, supple motion. Other placements of motion modules in the track may be possible, and another number of motion modules per track may be used. In a simple embodiment, already mentioned, one motion module at a crossing of a track may be sufficient under certain conditions.

FIG. 4B shows in schematic cross-section an embodiment in which a motion module is shown in more detail. In this embodiment, a part of the motion module is an extendable driving unit that can move up and down with respect to a face 3, 3'. It can be retracted, leaving the face free, and it can be extended in order to extend beyond the surface of a face and to engage a track of another element.

In this embodiment, many ways can be devices to provide a motion-restriction module. Furthermore, many ways can be found to provide a motion-guiding module. In this embodiment, a mechanical solution is presented. Thus, part of a motion-restriction module and a motion-guiding module is provided using a set of grooves 14 at both sides of track 11. The grooves 14 here provide opposite normal abutments working along a line normal to the face of an element, and opposite transverse abutments working along a line in-plane with respect to a face and cross with respect to the track. In a simple embodiment, the grooves 14 have a rectangular cross section. Here the grooves are parallel to the face, and parallel to track 11. Thus, the grooves 14 together provide part of a motion-restriction module and a motion-guiding module.

In this embodiment, another part of a motion-restriction module and a motion-guiding module is realized through parts 15 running in the grooves 14. The parts 15 run in grooves 14 and provide abutments in the grooves 14.

In FIGS. 5A-5C an alternative embodiment for the motion module, motion guiding module and motion restriction module is demonstrated. This embodiment demonstrates an embodiment that avoids mechanical means for realizing a motion module, a motion-guiding module and a motion-restriction module. Parts of a non-mechanical embodiment and a mechanical embodiment may be combined. This embodiment uses magnetic force. To that end, permanent magnets and switchable magnets may be combined.

The following embodiment can be realized in an element. In FIG. 5A, the elements 1, 1' both comprise at least one strip of magnets that can be switched on and off. Thus, the parts in a strip can be selectably activated. In this way, the strips in two elements can together form a distributed linear motor. In fact, the principle of a linear motor as such is known in the art. In this embodiment, such a linear motor is split into two separate parts. This allows the motor to function as a motion module. Using the magnetic force, the opposite strips 10, 10' in two elements that are on top of one another with their strips above one another can even provide at least part of a motion-guiding module.

In this embodiment, additional strips can be provided at the surface of an element. In accordance with embodiments, two strips can be provided in an element. These strips can be substantially parallel. Thus, the strips can function as a motion module and a motion-restriction module. In accordance with embodiments, two elements 1, 1' that are position one on top of the other. Both elements comprise two strips of selectably activatable magnets and that are parallel with respect to one another. The strips of the one element are furthermore substantially parallel with respect to the strips of the other element. Now, if several opposite parts of the strip of two elements that rest on top of one another are actuated in an opposite way, the strips can even provide a motion-restriction module. When activating the parts in one element in an opposite way with respect to parts in the strips of the other element, parts of the strip of one element are poled in one way, for instance north or south, and these parts are opposed by opposite poles, i.e., respectively south or north, of parts of the strip of the other element. Thus, the strips now attract one another.

The elements may be provided with at least two strips of magnet parts at or near one face 3 and that are provided substantially in a cross. As such, this is discussed above in a mechanical embodiment. It may also be possible to provide several strips at one face.

The use of selectably switchable magnet parts can even be provided in the following embodiment, providing control over the motion with respect to one another of two elements that rest one on top of the other. In FIG. 5C, an element is provided with a two-dimensional (2D) grid of selectably activatable magnet parts. Magnet parts may be integrated into the surface of a face 3 of an element 1, but may also be provided below the surface of a face 3. When elements 1, 1' are placed one on top of the other with the faces 3, 3' contacting one another, and the magnet parts of the elements are activated in a controlled manner, this can provide a 2D motion module. When opposite magnet parts are activated in an opposite way, the 2D magnet parts grid provides a motion-restriction module. By selectable activating magnet parts in a 2D grind in one element 1 and in the opposite element 1 resting on to of element 1, the magnet parts in both 2D grids interact. When opposite magnet parts are poled oppositely, two elements are attached and stick together. When subsequent magnet parts are activated, the effect of a plane-motor is realized. Subsequently activating magnet parts along a line over a face 3 will move elements 1 with respect to one another along that line. Faster motion may be achieved by activating groups of magnet parts.

The 2D magnet parts grid and the magnet parts strip may be combined.

The magnet parts may be provided below a low-friction surface of a face 3. For instance, a polymer material may be used. In particular, PTFE or a similar low-friction polymer material may be used.

In addition to the at least one strip and/or the 2D magnet parts grid, at least one mechanical motion module, motion-guiding module and/or motion-restriction module may be provided. For instance, a mechanical motion-restriction module may be activated to at least temporarily fix the position of two elements with respect to one another in a way that does not require the use of an energy source.

Figure 6A:
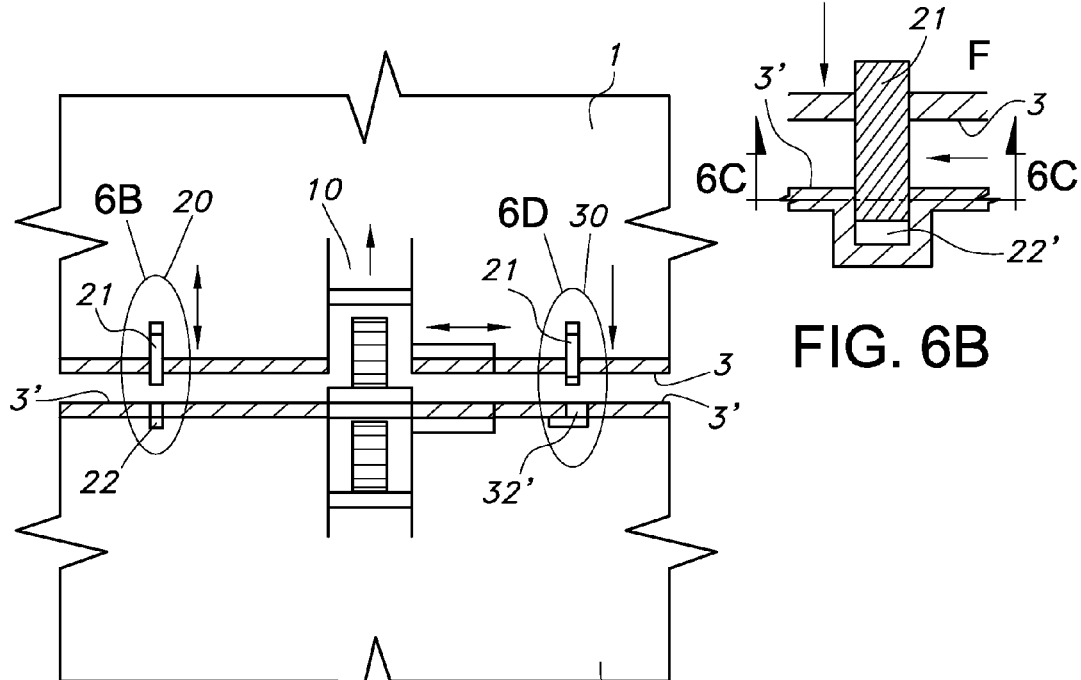
FIG. 6A-6D shows a separate motion module and motion-guiding module.
Figure 6B:
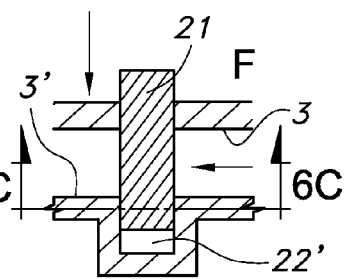
Figure 6C:
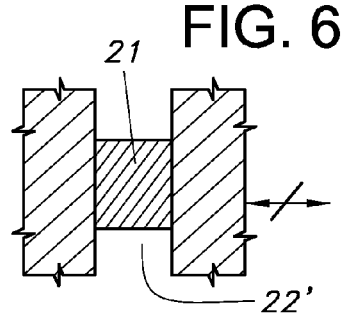
Figure 6D:
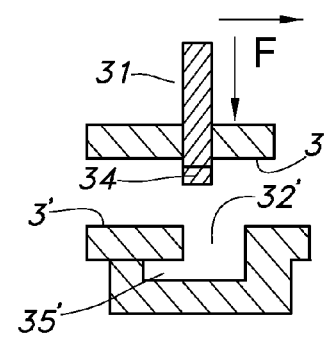

In FIGS. 6A-6D, schematically a mechanical embodiment using a separate motion module 10, a motion-guiding module 20, FIG. 6B in cross section en FIG. 6C in further cross section as indicated in FIG. 6B) and a separate motion-restriction module 30 (FIG. 6D in cross section) is shown.

The motion module comprises a caterpillar track in each element 1, 1'. Caterpillar tracks 10 here engages caterpillar track 10'. In caterpillar track 10, one driving wheels or elements extends in normal direction or face 3 until it engages the caterpillar track 10'. The caterpillar track may be one linear track along a face 3, and alternatively it is a pair of crossing caterpillar tracks laid out like in FIG. 4A.

The motion-restriction module 30 here is an extendable pin 31 that first is activated to extend out into a slot 32 in the opposite element. When pin 31 extends in slot 32, it rotates about its longitudinal axis. Thus, a cam 34 extending from pin 31 in transverse direction is rotated into undercut opening 35' in slot 32'. Can 34 thus hooks into undercut opening 35'. It holds the distance between the elements 1, 1'. This holds element 1 in position with respect to element 1'. In accordance with embodiments, slot 32' is a groove running along face 3 and having an undercut groove 35', thus motion-restriction module keeps the elements on top of one another during motion. Both elements 1 and 1' can both have parts of the motion-restriction module.

Motion-guiding module 20 of element 1 here is a simple, straight pin 21 running in a groove 22' in an opposite element 1'. Thus, a trail along face 3 is defined. In accordance with embodiments and to guide motion even better, the transverse cross section of pin 21 is rectangular, in particular square. It fits in groove 22'.

In FIGS. 7A-7D, yet another alternative embodiment of the motion module, motion-restriction module and motion-guiding module is schematically shown. This embodiment is based upon the use of piezo-elements for realizing parts of the modules mentioned. As such, there are principles like linear motors that are suited for application in the elements. In this embodiment, one type will be discussed.

In this embodiment, a rail 80 is provided. Furthermore here four piezo modules 70 are provided. The piezo module is extendible, in FIG. 7B, a cross section as indicated in FIG. 7A shows the piezo module 70 of element 1 in retracted position and piezo element 70' in element 1' also in retracted position. The piezo modules 70, 70' have two U elements that are interconnected by a piezo piece 72. When activated, length L changes and the distance between the U-elements also changes. FIG. 7C shows a top view of a piezo module 70, and FIG. 7D shows a side view of the piezo module 70. The distance D between legs 71 and 71' is such that it fits over the thickened part 83 of rail 80. The inner parts of legs 71, 71', in particular the outer ends, are here provided with clamping piezo elements 73, 73'. When activated, these piezo elements 73, 73' move inward and reduce the space D between legs 71, 71'. Thus, allowing the legs 71, 71' to clamp on the sides of rail 80, in the undercut grooves 82, 82'. Thus, when piezo elements 73, 73' are activated, piezo modules 70, 70' are fixed onto rail 80. Motion of piezo module 70 over rail 80 is possible by subsequent clamping of the U elements. If activation of piezo piece 72 is out of phase with the activation of the U elements, motion is possible.

Thus, here the piezo module 70, 70' together with rail 80 is motion module, motion-restriction module and motion guiding module.

Alternatively, the motion module may be based engaging elements using a hoist, winch, rack and pinion, chain drive, belt drive, rigid chain and rigid belt actuators which all operate on the principle of the wheel and axle. By rotating a wheel/axle (e.g. drum, gear, pulley or shaft) a linear member (e.g. cable, rack, chain or belt) moves. By moving the linear member, the wheel/axle rotates. Thus, elements may be put in motion with respect to one another.

Figure 8:
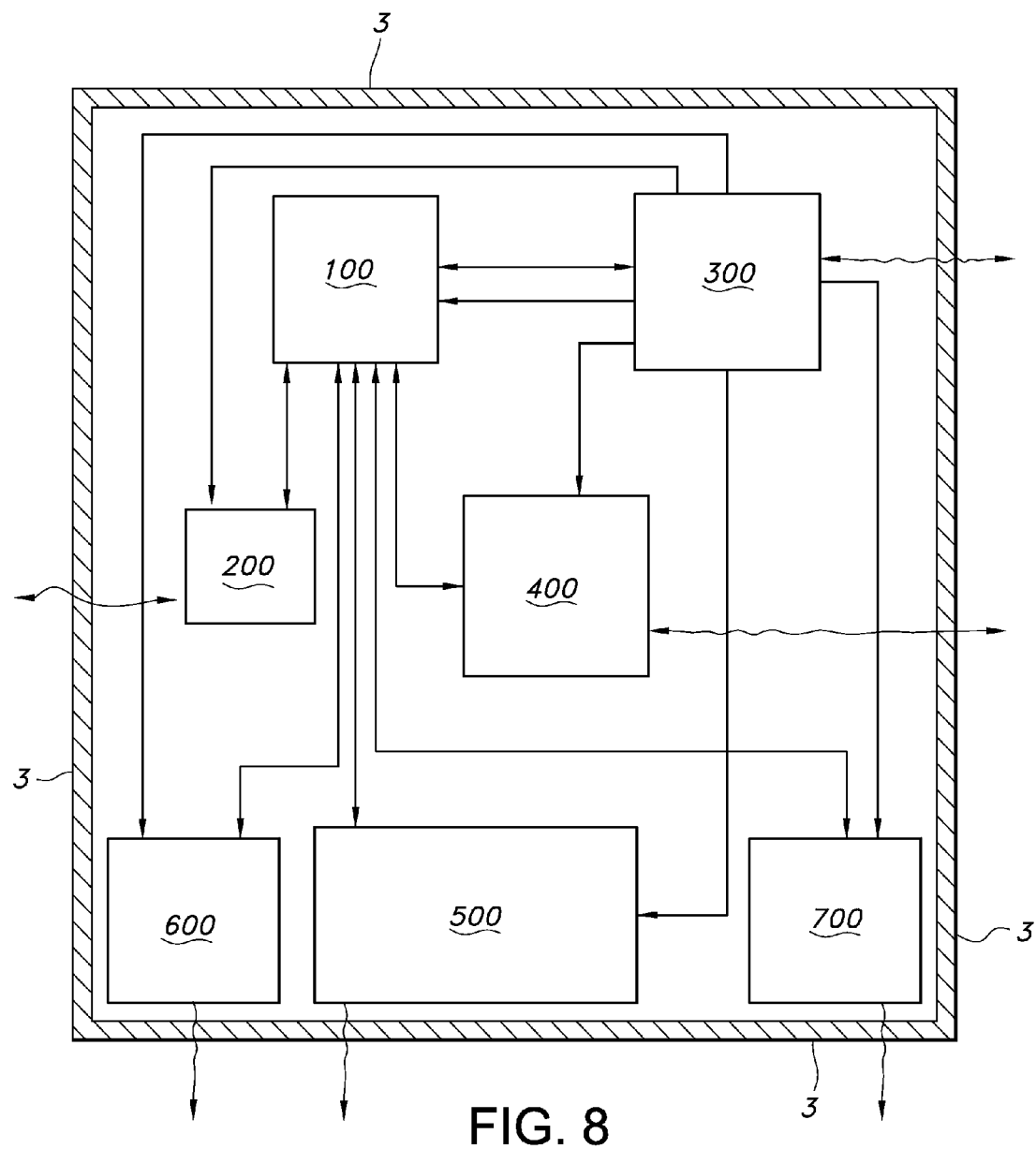
FIG. 8 shows a schematic drawing showing modules that may be present in an element, and the interconnection between modules.

In FIG. 8, a schematic cross section of an element 1 is shown, indicating the various components that may be present in an element 1. In this cross section, four faces 3 are indicated. Element 1 comprises a data processing unit 100, a data communication unit 200, an energy unit 300, a sensor unit 400, a motion-restriction module 600, a motion module 500 and a motion-guiding module 700. Next to these modules other modules may be present: for example an actuator which can move or rotate a retracted motion module within the element 1. The data processing unit 100 may be able to work together with other data processing units 100 of other elements 1 and distribute computational tasks to one another; a form of distributed computing or cloud computing.

The waving arrows indicate that the various modules and/or units can interact with the environment outside the element 1. For instance, a sensor unit 400 can measure a physical parameter outside an element 1.

An energy unit 300 may be charged from a source outside element 1. Charging may be wireless, for instance inductive, or using conductive surface patches, for instance.

A data communication unit 200 may transmit data to outside an element 1, or be able to receive data from outside an element 1. This may be data transmitted by another element 1. It may be an element that is in contact with element 1. Data communication may be analog or digital, be wireless via the electromagnetic spectrum, via sound or via other known wireless data transmission protocols, for instance zigby, bluetooth, wifi, Near Field Communication (NFC) or the like. Alternatively, data communication may be physically using conductive patches on the surface of the face 3 of an element. Using a sensor like a (digital) camera and analysing data taken by the camera is also a potential form of data communication; known examples are for instance QR-codes or bar-codes. Communication can go across several degrees of distances, even inter-planetary. The energy unit 300 in this embodiment provides energy to components (modules and/or units) in the element 1. This is indicated by single arrows running from the energy unit 300 to the other units and/or modules. An energy unit 300 may be an energy storage unit, for instance a chargeable battery, an accumulator, a capacitor, for instance a super capacitor, or the like. Alternatively, the energy unit 300 may also be a power generator which generates power. Examples of such an energy unit 300 are a fuel cell, a combustion engine, a photovoltaic element, or similar energy unit 300.

A sensor unit 400 may comprise one or more sensors that are able to detect a physical parameter. Examples of suitable sensors are a temperature sensor, a proximity sensor that detects the presence and/or distance of another element. A pressure sensor, an air-pressure sensor, a light sensor, a location sensor (GPS), a motion detecting sensor, an accelerometer, a moisture sensor, a gyroscope, and the like. Various sensor types that may also be used are also known in the field of robotics.

Examples of possible motion modules, motion-restriction modules, and motion-guiding modules are already described above. These modules as described can be based upon exertion of mechanical forces, or be based upon electromagnetic forces, chemical forces, physical forces, using for instance "van der Waals" forces, "Casimir forces", based upon surface tension, vacuum or air pressure, and the like.

Data processing unit 100 may for instance be a computer having various components known in computers, like memory, an arithmetic processor, data busses, end the like. Data processing unit 100 may be able to control the other parts in the element 1. It may even control at least part of at least one other element. For instance, in a master-slave setting state. It may also coordinate cooperation between elements 1. It may run a computer program. It may process instructions provided from an external source.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

What is claimed is:

1. A method for playing a game, comprising:
providing an initial shape of a plurality of elements to a user playing said game;
providing an end shape that includes said elements by displacing, using a motion module for at least one element, said motion module, controlled by said at least one element, is to provide said at least one element with an independent movement ability relative in relation to other elements, wherein said end shape is different than the initial shape;
providing a set of parameters which together with said end shape determine losing or winning said game;
providing the user with a set of tools, wherein the user may select programmable attributes of the elements by which each element is able to execute an element program independently;
allowing the user to make a selection from said set of tools;
transferring tools selected by the user to said elements;
starting the game, in which each one of said elements is to execute a respective element program, starting from said initial shape, in which said element program is to make an independent decision regarding movement of said element using control over said motion module; and
completing the game on a basis of said parameters, and a position of said elements in relation to said end shape.

2. The method of claim 1, wherein said game comprises a computer game.

3. The method of claim 1, wherein said programmable attributes comprise at least one selected from the group consisting of sensor attribute, communication attribute, energy attribute, motion attribute, motion restriction attribute, motion guiding attribute, program attribute.

4. The method of claim 1, wherein said element program comprises at least one selected from the group consisting of an element of randomization, a learning algorithm, and an artificial intelligence element.

5. The method of claim 1, wherein part of said element program makes use of one selected from the group consisting of randomization, probabilities, a feedback loop, a learning curve, a problem generator, a performance element, a world model made up out of the environment, and a world state available in said element program.

6. The method of claim 1, wherein said set of tools comprises a sensor function to provide input regarding the presence of another of the elements in contact with at least one face of said element for allowing displacement of said element based upon said input regarding said presence.

7. The method of claim 1, wherein said game comprises a computer implemented game, that includes providing a computer program which, when executing on a computer device, performs:
defining, in a memory, a set of at least three of said elements, each element having a centre point in said element, a relative position and an orientation;
defining, in the memory, a motion-guiding function, coupled to said centre point and defining a predefined trajectory over said element;
defining, in the memory, a motion function defining displacing the centre point with respect to a second centre point of one of the other elements using the motion-guiding function of that other element;
defining, in the memory, a motion-restriction function, adapted for limiting the displacement of said centre point with respect to the second centre point to at least one trajectory selected from the group consisting of said predefined trajectory and a second predefined trajectory of said other element, wherein said motion-guiding function of at least two of said elements define a functionally coupling between elements for enabling said motion function to displace the centre point of a third, displacing element which is in contact with one of the other two elements away from the centre point of one of the other two elements and towards the centre point and in contact with the other of the other two elements;

sensing other elements;

defining in a memory, said initial shape; and defining in a memory, said end shape.

8. The method of claim 1, wherein said element program, when executed, is to investigate, by computation, several potential actions or sequence of actions.

9. The method of claim 1, wherein said element program, when executed, is to determine which action has a highest benefit to one selected from the corresponding element and to one or more other elements, and subsequently select that action and execute that action or sequence of actions, wherein elements are to communicate to other elements regarding the action or sequence of actions.

10. The method of claim 1, wherein said elements use one selected from a sensor to detect a direct neighbor, a sensor to detect another element two positions further, a sensor to determine if the other element is in contact with the element two positions further, or a combination thereof.

11. The method of claim 1, wherein in said method a data processing unit of an element is applied to perform one selected from working together with other data processing units of other elements and distribute computational tasks to one another, forming distributed computing, and forming cloud computing.

12. The method of claim 1, wherein said plurality of elements each have:

a geometric shape;

a centre point;

a relative position;

at least one face coupled to said centre point, an orientation, and:

a motion-guiding function, coupled to said centre point and defining a trajectory over said element, a motion-restriction function to limit the displacement of said centre point with respect to the second centre point to at least one trajectory selected from said trajectory and a second trajectory of said other element, and a function comprising at least one sensor to provide input regarding the presence of another of the elements in contact with at least one face of said element for allowing displacement of said element based upon said input regarding said presence; and an element program operationally coupling said motion guiding function, said motion-restriction function and said at least one sensor, and which said element program, when executed, is to allow movement of one or more of the elements when further functionally coupling said motion function, said element program basing at least part of its decision-making regarding movement to the goal state on a factor of randomness, a motion function providing one or more of the elements with independent movement ability defining a movement of the centre point with respect to a second centre point of one of the other elements using the motion-guiding module of that other element;

a computer program comprising instructions which, when executed by the processor, is to define, in the memory, a set of the elements, and the motion function, wherein:

said motion-guiding function of at least two of said elements define a functionally coupling between elements for enabling said motion function to displace the centre point of a third, displacing element which has a face in contact with a face of one of the other two elements away from the centre point of one of the other two elements and towards the centre point and in contact with the other of the other elements, defining, in the memory, said initial shape with an initial outer boundary of said set of elements, and at least a position of each element with respect to said initial outer boundary, and said end shape, the end shape being different from said initial shape and requiring displacement of at least one element.

13. The method of claim 12, wherein said set of tools is defined in a function toolbox comprising a set of said motion-guiding functions, a set of said motion functions, a set of said motion-restriction functions and a set of said functions comprising at least one sensor, presenting said function toolbox to a user, enabling said user to select at least one function from said function toolbox for each element, and transferring said at least one selected function to said element program.

14. The method of claim 13, further comprising:

presenting said function toolbox to said user and enabling said user to select at least one function from said function toolbox for each element program;

each said element program operationally coupling said selected function, and said element program, when executed, is to allow movement of an element based upon said contact input, and executing, for each element, said element program.

15. The method of claim 12, wherein said end shape is defined in a building plan, and wherein at least one element program is to be provided with at least part of said building plan.

16. The method of claim 12, wherein said building plan is distributed over each said element program, and said element program is to exchange at least part of said building plan.

17. The method of claim 12, further comprising providing input regarding the presence of another element in contact with at least one face.

18. The method of claim 12, wherein said set of sensor functions further comprise a sensor to sense the relative position and orientation of said element with respect to at least one other element, and provide information on a spatial position of said at least one other element, and thereby permit movement of said element further based on the sensed relative position and orientation.

19. The method of claim 1, wherein at least one of said elements when executing said element program and after moving from said initial shape, is to make at least one decision regarding movement of said at least one of said elements.

20. The method of claim 1, wherein each element encompasses a motion module.

21. The method of claim 1, wherein at least one of said elements is configured to make a decision to move, and move by using said control over said motion module.

22. A game comprising shape-shifting an object of elements from a first shape to a second shape, wherein the position of at least one element with respect to at least one other of said elements changes during said shape-shifting, said game comprising:
- a processor;
- a computer program which, when executing on said processor, performs:
  - defining, in a memory, a set of a plurality of said elements having a geometric shape, each element having a centre point, a relative position, at least one face coupled to said centre point, an orientation;
  - defining, in the memory, an initial state of said set of elements, an initial outer boundary of said set of elements, and at least a position of each element with respect to said initial outer boundary;
  - defining, in the memory, a goal state of said set of elements, which goal state is different from said initial state and requiring displacement of at least one element;
  - providing a set of parameters which together with said end shape determine losing or winning said game;
  - providing the user with a set of tools, wherein the user may select programmable attributes of the elements by which each element is to execute a respective element program independently;
  - allowing the user to make a selection from said set of tools;
  - transferring the selected tools selected by the user to said elements;
  - starting the game, wherein said elements are to execute a respective program, starting from said initial shape, in which said element program is to make an independent decision regarding movement of said element; and
  - completing the game on a basis of said parameters and a position of said elements in relation to said end shape.

23. The game of claim 22, further comprising providing physical elements, wherein said selected tools are transferred to said respective element program of said elements.

24. The game of claim 22, wherein at least one of said elements when executing said element program and after moving from said initial shape, is to make at least one decision regarding movement of said at least one of said elements.

25. A data carrier provided with a non-transitory computer program product which, when executing on a processor, performs the method of claim 1.

* * * * *